United States Patent [19]
Ciocca et al.

[11] Patent Number: 6,025,079
[45] Date of Patent: Feb. 15, 2000

[54] HEAT-SHRINKABLE MULTI-LAYER FILM

[75] Inventors: Paolo Ciocca, Lumellogno; Roberto Forloni, Milan, both of Italy

[73] Assignee: Cryovac, Inc., Duncan, S.C.

[21] Appl. No.: 09/065,017

[22] PCT Filed: Oct. 16, 1996

[86] PCT No.: PCT/EP96/04500

§ 371 Date: Jul. 2, 1998

§ 102(e) Date: Jul. 2, 1998

[87] PCT Pub. No.: WO97/14558

PCT Pub. Date: Apr. 24, 1997

[30] Foreign Application Priority Data

Oct. 18, 1995 [IT] Italy .................................. MI95A2137

[51] Int. Cl.⁷ .............................. B32B 27/08; B32B 27/32
[52] U.S. Cl. ........................... 428/515; 428/517; 428/521
[58] Field of Search ..................................... 428/347, 349, 428/500, 516, 910, 515, 517, 521

[56] References Cited

U.S. PATENT DOCUMENTS

| | | | |
|---|---|---|---|
| 4,390,385 | 6/1983 | Ferguson et al. | 156/229 |
| 5,212,009 | 5/1993 | Peiffer et al. | 428/220 |
| 5,372,882 | 12/1994 | Peiffer et al. | 428/34.9 |
| 5,443,895 | 8/1995 | Peiffer et al. | 428/220 |

FOREIGN PATENT DOCUMENTS

| | | |
|---|---|---|
| 3 545 812 | 6/1993 | European Pat. Off. . |
| 2 115 348 | 9/1983 | United Kingdom . |

*Primary Examiner*—Blaine Copenheaver
*Attorney, Agent, or Firm*—Mark B. Quatt

[57] ABSTRACT

A heat shrinkable multilayer film includes a core layer including a blend having ethylene/propylene copolymer and propylene homopolymer, or ethylene/propylene/propylene/butene-1 terpolymer and propylene homopolymer; and two outer layers each including at least 50%, by weight of each respective outer layer, of ethylene/propylene/butene-1 terpolymer, ethylene/propylene copolymer, or a blend of ethylene/propylene/butene-1 terpolymer and ethylene/propylene copolymer.

7 Claims, No Drawings

HEAT-SHRINKABLE MULTI-LAYER FILM

The present invention refers to a new heat-shrinkable multi-layer film with very good optical and mechanical properties, improved heat-shrinkability properties and sealability, particularly suitable for high-speed packaging of food and non food items.

Heat-shrinkable thermoplastic films have many useful applications in the packaging industry for food and non food products.

In general terms the packaging of food and non-food items by means of a heat-shrinkable thermoplastic film comprises configuring the heat-shrinkable packaging material, either partially or completely, around a product, removing excess air if necessary, sealing it to itself or to the rims of a support containing the product to be packaged or otherwise let the two edges of the packaging material to overlap and adhere to each other without heat-sealing them and thereafter exposing the package to a heat source thereby causing the heat-shrinkable film to shrink and conform with the contours of the packaged item or become tight between the rims to which it has been sealed.

These films should be used to both provide the package with an aestethically appealing appearance and guarantee that because of their good mechanical properties the packaged product would be protected from the environment.

Heat-shrinkable films are typically made by extruding or coextruding polymers from a melt into a thick film, followed by a quick quenching to prevent or delay crystallization and by orientation of the thick film by stretching it, either monoaxially or preferably biaxially, under temperature conditions where molecular orientation of the film occurs and the film does not tear. Upon subsequent re-heating at a temperature close to the orientation temperature it will tend to shrink in seeking to recover its original dimensional state.

The polymers can be extruded or co-extruded through a round die giving a tubular thick film called "tape", that is immediately and quickly quenched by means of a water bath or cascade typically to about room temperature. Said tape is then heated at the orientation temperature and stretched biaxially, while at this temperature, e.g. by the so-called "trapped bubble" technique that uses internal gas pressure to expand the diameter of the tape to form a large "bubble" and advancing the expanded tube at a faster rate than the extrusion rate so as to obtain transverse and machine directions of orientation respectively. Usually the stretch is at least about 3x in each direction. The film is then cooled and rolled up in the cooled state so as to retain the property of heat-shrinkability. The orientation temperature range generally depends on the type of polymers employed and on the end use of the film. The orientation temperature used for the manufacture of heat-shrinkable films is in any case lower than the melting temperature of at least one polymer present in the film.

Alternatively heat-shrinkable films can be obtained by extruding the polymers through a flat die in the form of a sheet, and after a quenching step, heating the sheet to the orientation temperature and stretching it. Longitudinal orientation is generally obtained by running the sheet over at least two series of pull rolls wherein the second set runs at a higher speed than the first one. Cross-wise or transversal orientation is generally done in a tenter frame where the edges of the sheet are grasped by clips carried by two continuous chains running on two tracks that move wider apart as they go along. In alternative to the above described sequential stretching, i.e. either longitudinal first and then transverse or vice-versa, the stretching may be simultaneous in both directions. The stretched film is then cooled and rolled up as usual. Also in the case of orientation by a tenter frame the stretch is usually at least about 3x in each directions, but higher ratios are also common.

Most commonly, however, in the case of tenter frame orientation, the process includes a step of so-called "heat-setting" or "fixing" where the film is heated while restrained from shrinking and thus thermofixed so as to provide a heat stable film. As an example tenter frame orientation followed by heat setting is the method industrially used for the manufacture of biaxially oriented polypropylene (BOP), a film that has no or a minimum shrink.

Polypropylene-based heat-shrinkable multilayer films are known in the literature. BE-A-888,914 describes a heat-shrinkable film comprising (a) a base layer of propylene homopolymer and (b) a surface layer fixed to the base layer and comprising a mixture of 50–100% by weight of ethylene-propylene copolymer and 50–0% by weight of propylene homopolymer.

EP-B-126,640 claims a polypropylene composite stretched film comprising a base layer (a) consisting of a crystalline polypropylene and a heat-sealing layer (b) consisting of ethylene-propylene random copolymer and/or ethylene-propylene-butene-1 random terpolymer, characterized in that the heat sealing layer consists of either (i) a crystalline ethylene-propylene random copolymer containing 1 to 5% by weight of polymers having a molecular weight of 6,000 or less and 3 to 15% by weight of ethylene, each based on the weight of the copolymer or (ii) a crystalline ethylene-propylene-butene-1 random terpolymer containing 1 to 5% by weight of polymers having a molecular weight of 6,000 or less and 1 to 10% by weight of ethylene, and 4 to 30% by weight of butene-1, each based on the weight of the copolymer.

These films possess good optical and mechanical (high stiffness) properties but have the drawback of a limited shrink and the need for a high shrink temperature. As a matter of fact, polypropylene does not impart a high shrink to the film; furthermore, it requires the use of a high orientation temperature to stretch the film without tearing it. This reflects into a low shrink of the film at the temperatures used in the packaging process, particularly in the packaging of fresh food where the packaged items are passed through a hot air tunnel heated at temperatures generally not higher than 140–150° C.

Alternatives are suggested in several patents including EP-B-282,282 that claims a multilayer heat-shrinkable film obtainable by forming an assembly that comprises an interlayer comprising a flexible propylene resin, preferably a blend of a flexible polypropylene with a hydrocarbon resin, having a Vicat softening point of 115° C. or less, and/or a VLDPE, sandwiched between outermost layers comprising a propylene resin having a Vicat softening point higher than that of the flexible propylene resin of the interlayer, followed by stretching said assembly. However the choice of a polypropylene resin having a Vicat softening point lower than 115° C. drastically limits the choice of available polymers rendering the above solution uneasy.

Other documents describe multilayer films or sheets comprising propylene copolymers which however are expressly designed for specific end uses. As an example, EP-A-400,456 describes heat-shrinkable films of a fairly thick base layer made of a blend of polypropylene homo- and co-polymers with hydrogenated hydrocarbon resins and very thin sealing layers on both sides of the base one. These films, which have almost no shrink in the longitudinal direction, are used as shrink labels, and more particularly as so-called sleeves (all-round shrink labels).

Also JP-A-62086388 (Derwent Accession Number 87-147803) describes thick, 2- or 3-layer, films comprising propylene copolymers for use as heat-shrinkable labels. Said films have a base layer of ethylene-propylene copolymer and one or two outer layers made of ethylene-propylene copolymer or propylene-butene copolymer. Specific requirements for the ethylene content and the melting points of the resins employed and for the layers' ratio are indicated.

Desirable properties in heat-shrinkable multilayer films to be used for packaging purposes always include optics, mechanical properties, sealability, and shrinkability. Although multilayer packaging films in the prior art may satisfy some of the needs in the packaging art, room for improvement exists in pursuit of a packaging film with improved characteristics over materials used in the past or particularly suitable for a specific application.

It is thus an object of the present invention to provide a packaging film with good optical and mechanical properties, comparable to those of prior polypropylene packaging films, and endowed with improved heat-shrinkability.

It is a further object of the present invention to provide a packaging film with good optical properties, mechanical properties and heat-shrinkability, and improved sealability.

It is a further object of the present invention to provide a packaging film with good optical properties, mechanical properties, and heat-shrinkability, and improved planarity and thickness control, particularly useful for high speed machinability.

DEFINITIONS

As used herein, the phrase "core layer" or "inner layer" or "internal layer" refers to any film layer having its two principal surfaces adhered to other layers of the multilayer film.

As used herein the phrase "outer layer" or "skin layer" refers to any film layer of a multilayer film having only one of its principal surfaces directly adhered to another layer of the film.

As used herein, the phrases "seal layer" and "sealing layer" refer to an outer film layer involved in the sealing of the film to itself, another film layer of the same or another film, and/or another article which is not a film.

As used herein, the phrase "free shrink" refers to the percent dimensional change in a 10 cm×10 cm specimen of film, when shrunk at a specified temperature. The quantitative determination is carried out according to ASTM D 2732, as set forth in the 1990 Annual Book of ASTM Standards, Vol. 08.02, pp. 368–371.

As used herein by the term "heat-shrinkable" it is intended to refer to films showing a % free shrink of at least 15%, in at least one direction, when heated at a temperature of 140° C. for 4 seconds in accordance with the above indicated ASTM method.

As used herein, the phrase "longitudinal direction", or "machine direction," herein abbreviated "MD", refers to a direction "along the length" of the film, i.e., in the direction of the film as the film is formed during extrusion.

As used herein, the phrase "transverse direction," herein abbreviated "TD," refers to a direction across the film, perpendicular to the machine direction.

Orientation ratios are generally expressed in terms of the amount of orientation in one direction times the amount of orientation in the other direction, e.g., the machine direction, times the amount of orientation in the transverse direction. For example, "3×3", "3×5", etc.

As used herein, the phrases "corona treatment" and "corona discharge treatment" refer to subjecting the surfaces of the thermoplastic film to corona discharge, i.e., the ionization of a gas such as air in close proximity to a film surface, the ionization initiated by a high voltage passed through a nearby electrode, and causing oxidation and other changes to the film surface. Corona treatment of polymeric materials is disclosed e.g. in U.S. Pat. No. 4,120,716, that describes the improved adherence characteristics of polyethylene surfaces by corona treatment, to oxidize the polyethylene surface.

As used herein, the term "polymer" refers to the product of a polymerization reaction, and is inclusive of homopolymers, copolymers, terpolymers, etc.

As used herein, the term "homopolymer" is used with reference to a polymer resulting from the polymerization of a single monomer, i.e., a polymer consisting essentially of a single type of repeating unit.

As used herein, the terms "copolymer" and "terpolymer" refer respectively to polymers formed by the polymerization reaction of two or three different monomers.

As used herein, copolymers are identified, i.e., named, in terms of the monomers from which the copolymers are produced.

The phrase "ethylene-propylene copolymer" or "EPC" refers therefore to a copolymer produced by the copolymerization of both propylene and ethylene, wherein the major amount is of propylene derived units and there is a smaller amount of ethylene derived units.

The term "ethylene-propylene-butene-1 terpolymer" or "EPB" refers to terpolymers incorporating these three comonomers in various percentages.

As used herein preferably said terms refer to random co- and ter-polymers.

As used herein the phrase "major proportion", when referred to a polymer or a polymer blend in a film layer, is intended to mean that the given polymer or given polymer blend represents at least 50% by weight of the entire weight of the layer considered.

For the purposes of the present application, the term "consisting essentially of" does not exclude the presence of additives, conventionally employed in this field, that are added to the resins in very small amounts with the aim at improving polymer processability or end film performance. Exemplary of such additives are for instance antioxidants, slip and antiblocking agents, UV absorbers, pigments, antifog agents or compositions, antimicrobial agents, cross-linking agents, crosslinking-controlling agents, oxygen scavenging agents or compositions used to improve the film barrier properties, and the like agents.

DETAILED DESCRIPTION OF THE INVENTION

The present invention is directed to a heat-shrinkable multilayer film comprising a core layer consisting essentially of a blend of ethylene-propylene copolymer and/or ethylene-propylene-butene-1 terpolymer with polypropylene homopolymer, and two outer layers each comprising a major proportion of a polymeric material selected from the group consisting of ethylene-propylene-butene-1 terpolymers, ethylene-propylene copolymers and blends thereof.

The amount of polypropylene homopolymer in the blend of the core layer is comprised between about 20 and about 70% by weight. Preferably it is comprised between about 25 and about 60% by weight, and even more preferably it is up to about 50%, more particularly comprised between about 30 and about 50% by weight.

Preferably the amount of ethylene-propylene copolymer and/or ethylene-propylene-butene-1 terpolymer in the outer layers is at least about 70% by weight, more preferably it is at least about 85, and even more preferably it is at least about 90% by weight.

Generally and preferably the composition of the outer layers is different from that of the core layer.

In a preferred embodiment of the present invention the outer layers are either made of ethylene-propylene copolymer and/or ethylene-propylene-butene-1 terpolymer or of a blend thereof with polypropylene homopolymer.

In a preferred embodiment, the present invention is directed to a heat-shrinkable multilayer film comprising a core layer essentially consisting of a blend of $\leq 50\%$ by weight of polypropylene homopolymer, $\geq 40\%$ by weight of ethylene-propylene copolymer, and $\leq 10\%$ by weight of ethylene-propylene-butene-1 terpolymer, and two outer layers essentially consisting of a major proportion of ethylene-propylene-butene-1 terpolymer optionally blended with up to 15% by weight of polypropylene homopolymer.

Additional inner layers may be present in the films according to the present invention, including bulk layers, tie layers, barrier layers, etc.

In a preferred embodiment however the invention provides for a three layer film consisting of the core layer and the outer layers as defined above.

Preferably the film according to the present invention is symmetrical in structure or substantially symmetrical in structure. With the term "substantially" it is meant herein that the symmetrical layers may slightly differ for the presence of additives, such as antioxidants, slip and anti-blocking agents, anti-fog, and the like agents that can be added to any of the film layers, particularly to the outer layers, in different percentages.

In another preferred embodiment the invention provides for a five layer film. Also in this case the film will be preferably symmetrical or substantially symmetrical with the core layer, as defined above, sandwiched between two inner layers. In a preferred aspect said last inner layers will contain recycle material from the whole film. Alternatively, as in the case of the three layer film, the recycle scrap, if any, will suitably be introduced into the core layer.

The heat-shrinkable multilayer film of the present invention is typically prepared by cast coextrusion methods and subsequently oriented at the suitably selected orientation temperature, either by means of a trapped bubble method (when the coextrusion is done through a round die), or, preferably, by means of a tenter frame (particularly when the coextrusion is done through a flat die).

Coextrusion through a flat die and orientation via tenter frame is a preferred method of manufacture of the film according to the present invention as the film thus obtained has a better planarity and a more controlled thickness than that obtained via coextrusion through a round die and orientation by the trapped bubble technique and this allows a higher speed machinability of the film that renders it particularly useful for certain types of applications.

A further object of the present invention is therefore a heat-shrinkable multilayer film comprising a core layer consisting essentially of a blend of ethylene-propylene copolymer and/or ethylene-propylene-butene-1 terpolymer with polypropylene homopolymer and two outer layers each comprising a major proportion of a polymer selected from ethylene-propylene-butene-1 terpolymer, ethylene-propylene copolymer and blends thereof, whenever obtained by flat cast coextrusion followed by orientation via tenter frame.

The films according to the present invention can be subjected to a corona treatment to improve their self adhesion and render them particularly suitable for certain types of applications, such as rollwrapping, wherein the packaging material is not heat-sealed to itself before submitting the package to the heat-shrinking step, but the edges of the packaging material are simply overlapped and adhere one to each other by static forces. Such a corona treatment can be carried to a surface energy level of up to about 70 dynes/cm, and preferably of up to about 60 dynes/cm.

For the type of applications where heat-shrinkable polypropylene based films are conventionally employed, the film thickness is generally less than about $30\mu$, typically it is from about 10 up to about $25\mu$, preferably from about 12 to about $20\mu$.

The layer ratio can vary widely depending on the overall thickness of the film and the number of layers. There are no specific limitations as the skin layers can be as thin as $1\mu$. As an example, however, in a symmetrical 3-layer film with a thickness up to $25\mu$, an optimum layer ratio could range from 1/10/1 to 5/1/5, e.g. 1/5/1 to 1/2/1.

The following examples are representative of some preferred embodiments of heat-shrinkable films according to the present invention.

The following resins were used in the production of multilayer films in accordance with the present invention as are set forth in the examples below as well as in the comparative films:

PP1 xHC 101F from Borealis—a polypropylene homopolymer with d=0.903 g/cc and MFI=3.35 g/10' (ASTM D1238–230° C. 2.160 kg)

PP2 Profax PD-064 from Montell—a polypropylene homopolymer with d=0.904 g/cc and MFI=3.0 g/10' (ASTM D1238–230° C./2.16 kg)

EPC Eltex P KS 409 from Solvay—an ethylene-propylene random copolymer with 3.2% by weight of ethylene. Vicat softening point: 120° C. (ASTM D 1525)

EPB1 Eltex PKS 309-X 4752 from Solvay—an ethylene-propylene-butene-1 random terpolymer with about 2% by weight of ethylene and about 7% by weight of butene-1. Vicat softening point: 113° C. (ASTM D 1525)

EPB2 Adsyl 5C 37 F from Montell—an ethylene-propylene-butene-1 random terpolymer with about 3% by weight of ethylene and about 6% by weight of butene-1. Vicat softening point: 120° C. (ASTM D 1525).

EXAMPLE 1

A $20\mu$ thick 3-layer film, A/B/A, with a layer ratio of about 1/5/1, wherein A is a blend of EPC (87.5% by weight) and PP2 (12.5% by weight) comprising slip and antiblocking agents and B is a blend of EPC (40% by weight) and PP1 (60% by weight), has been prepared by coextrusion through a flat die at a die temperature of from about 200 to about 240° C., followed by sequential orientation on a tenter frame (stretching ratios: 5×8.3, MD×TD) at temperatures of about 92° C. (MD orientation temperature) and about 142° C. (TD orientation temperature).

EXAMPLE 2

The film of this Example has been prepared by following the same procedure as in Example 1 with the difference that B is a blend of EPC (60% by weight) and PP1 (40% by weight).

EXAMPLE 3

The film of this Example has been prepared by following the same procedure as in Example 1 with the difference that B is a blend of EPC (80% by weight) and PP1 (20% by weight).

COMPARATIVE EXAMPLE 4

The film of this Comparative Example has been prepared by following substantially the same procedure as in Example 1 with the difference that B is 100% EPC.

COMPARATIVE EXAMPLE 5

The film of this Comparative Example has been prepared by following substantially the same procedure as in Example 1 with the difference that B is 100% PP1 and that the MD stretching temperature has been increased to about 100° C. and the TD stretching one to about 148° C.

In order to evaluate the performance of the above films the following tests were employed:

% Unrestrained linear shrinkage: the percent free shrink, i.e. the irreversible and rapid reduction, as a percent, of the original dimensions of a sample subjected to a given temperature under conditions where nil restraint to inhibit shrinkage is present, has been measured according to ASTM D2732, by immersing for 4 seconds specimens of the structures to be tested (100 mm×100 mm) into an oil bath heated to 140° C. This attribute has been measured in the longitudinal direction (LS) as well as in the transversal direction (TS).

Haze: haze is defined as that percentage of transmitted light which in passing through the specimen deviates from the incident beam by forward scattering, and it has been measured by ASTM D 1003 (Procedure A).

Gloss: the specular gloss of the films, i.e. the relative luminous reflectance factor of a specimen in the mirror direction has been measured using ASTM 2457 - 90 with a gloss angle of 60°.

Heat Seal Strength: the maximum tensile load per unit width, expressed in g/125 mm, required to break the seal (obtained at a given temperature) of a test specimen. The sealed specimens are prepared by means of an hot bar sealer having an upper sealing bar electrically heated, about 460 mm long, with a trapezoidal cross-section having the minor base (the sealing one) 5.5 mm wide, and a counter bar of silicon rubber, 55 Shore A hard, covered with Teflon™ tape. The sealing time is set at 0.5 sec and the sealing pressure is set at 1.2±0.2 kg/cm². Three different sealing temperatures are tested: 130° C., 140° C., and 150° C. Each sample tested is sealed in both longitudinal (LD) and transverse direction (TD). 25 mm wide specimens are then cut both in LD and TD and the seal strength of each specimen is then measured by means of an Instron tensile tester.

The % free shrink at 140° C., haze and gloss of the films of the above Examples and Comparative Examples are reported in following TABLE I, while the Heat Seal Strength values at the different temperatures are reported in Table II.

TABLE I

| Film of Ex. No. | % Free Shrink | | Haze (%) | Gloss |
|---|---|---|---|---|
| | LS | TS | | |
| 1 | 22 | 30 | N.D. | N.D. |
| 2 | 34 | 42 | 2.7 | 129 |
| 3 | 43 | 55 | 1 | 136 |
| Comp. Ex. 4 | 46 | 56 | 1.3 | N.D. |
| Comp. Ex. 5 | 18 | 21 | 2.4 | N.D. |

(N.D. = not determined)

TABLE II

| | Heat Seal Strength | | | | | |
|---|---|---|---|---|---|---|
| | 130° C. | | 140° C. | | 150° C. | |
| Film of Ex. No. | LD | TD | LD | TD | LD | TD |
| 1 | 0 | 0 | 88 | 64 | 696 | 467 |
| 2 | 0 | 0 | 0 | 0 | 49 | 33 |
| 3 | 4 | 13 | 60 | 0 | 33 | 66 |
| Comp. Ex. 4 | 0 | 0 | 0 | 0 | 0 | 0 |
| Comp. Ex. 5 | 0 | 0 | 156 | 156 | 286 | 372 |

The film of Comparative Example 4 differs from the films of Examples 1 to 3 for the composition of the core layer that does not contain any polypropylene homopolymer but is made of 100% ethylene-propylene copolymer. Said film shows a high shrink but appears extremely poor in sealability in spite of the fact that the sealing layers are identical.

The film of Comparative Example 5 that differs from the films of Examples 1 to 3 for the core layer that is 100% polypropylene homopolymer, has a good sealability but a very low free shrink.

EXAMPLE 6

A 15μ thick 3-layer film, A/B/A, with a layer ratio of about 1/4/1, wherein A is a blend of EPC (87.5% by weight) and PP2 (12.5% by weight) comprising slip and antiblocking agents and B is a blend of EPC (40% by weight) and PP1 (60% by weight), has been prepared by coextrusion through a flat die at a die temperature of from about 200 to about 240° C., followed by sequential orientation on a tenter frame (stretching ratios: 5×8.3, MD×TD) at temperatures of about 90° C. (MD orientation temperature) and about 142° C. (TD orientation temperature).

EXAMPLE 7

A 20μ thick 3-layer film, A/B/A, with a layer ratio of about 1/5/1, wherein A is EPB2 comprising slip and antiblocking agents and B is a blend of EPC (70% by weight) and PP1 (30% by weight), has been prepared by coextrusion through a flat die at a die temperature of from about 200 to about 240° C., followed by sequential orientation on a tenter frame (stretching ratios: 5×8.3, MD×TD) at temperatures of about 92° C. (MD orientation temperature) and about 142° C. (TD orientation temperature).

COMPARATIVE EXAMPLE 8

The film of this Comparative Example has been prepared by following essentially the same procedure of Example 7 but using only PP1 for the inner layer B and increasing the MD orientation temperature to about 120° C. and the TD orientation one to about 145° C.

The % free shrink at 140° C., haze and gloss of the films of Example 7 and Comparative Example 8 are reported in TABLE III below:

TABLE III

| | % Free Shrink | | | |
|---|---|---|---|---|
| Film of Ex. No. | LS | TS | Haze (%) | Gloss |
| 7 | 34 | 46 | 2.2 | 112 |
| Comp. Ex. 8 | 14 | 20 | 1.6 | N.D. |

EXAMPLE 9

A 15μ thick 3-layer film, A/B/A, with a layer ratio of about 1/4/1, wherein A is EPB2 and B is a blend of EPC (70% by weight) and PP1 (30% by weight), has been prepared by coextrusion through a flat die at a die temperature of from about 200 to about 240° C., followed by sequential orientation on a tenter frame (stretching ratios: 5×8.3, MD×TD) at temperatures of about 80° C. (MD orientation temperature) and about 142° C. (TD orientation temperature).

EXAMPLE 10

The film of this Example has been prepared by following the same procedure as in Example 9 with the difference that A is a blend of EPB2 (94% by weight) and PP2 (6% by weight) comprising slip and antiblocking agents and that the MD orientation temperature was 75° C.

EXAMPLE 11

The film of this Example has been prepared by following the same procedure as in Example 10 with the difference that B is a blend of EPC (50% by weight) and PP1 (50% by weight) and that the MD orientation temperature was 78° C.

COMPARATIVE EXAMPLE 12

A 20μ thick 3-layer film, A/B/A, with a layer ratio of about 1/5/1, wherein A is a blend of EPB2 (87.5% by weight) and PP2 (12.5% by weight) comprising slip and antiblocking agents and B is PP1, has been prepared by coextrusion through a flat die at a die temperature of from about 200 to about 240° C., followed by sequential orientation on a tenter frame (stretching ratios: 5×8.3, MD×TD) at temperatures of about 135° C. (MD orientation temperature) and about 145° C. (TD orientation temperature).

COMPARATIVE EXAMPLE 13

The film of this Comparative Example has been prepared by following substantially the same procedure as in Comparative Example 12 with the only differences that core layer B is 100% EPC and the MD stretching temperature has been lowered to about 92° C. and the TD stretching one to about 142° C.

The % free shrink at 140° C., haze and gloss of the films of the above Examples 9 to 11 and Comparative Examples 12–13 are reported in following TABLE IV, while the Heat Seal Strength values at the different temperatures are reported in Table V.

TABLE IV

| | % Free Shrink | | | |
|---|---|---|---|---|
| Film of Ex. No. | LS | TS | Haze (%) | Gloss |
| 9 | 35 | 48 | N.D. | N.D. |
| 10 | 35 | 48 | 2.5 | 129 |
| 11 | 30 | 41 | 3.0 | 125 |
| Comp. Ex. 12 | 15 | 20 | 1.7 | N.D. |
| Comp. Ex. 13 | 47 | 59 | 1.2 | N.D. |

TABLE V

| | Heat Seal Strength | | | | | |
|---|---|---|---|---|---|---|
| | 130° C. | | 140° C. | | 150° C. | |
| Film of Ex. No. | LD | TD | LD | TD | LD | TD |
| 9 | 441 | 516 | 486 | 786 | 701 | 883 |
| 10 | 647 | 557 | 619 | 501 | 720 | 509 |
| 11 | 388 | 290 | 492 | 474 | 526 | 727 |
| Comp. Ex. 12 | 173 | 96 | 272 | 338 | 286 | 344 |
| Comp. Ex. 13 | 0 | 0 | 0 | 0 | 18 | 0 |

While the film of Comparative Example 12, that has a polypropylene homopolymer core layer, has a fair sealability but a very low free shrink, the film of Comparative Example 13, that has an ethylene-propylene copolymer core layer, shows a high shrink but is extremely poor in sealability.

The films of Examples 3, 7, 10, and 11 have been evaluated also for planarity. The main planarity deficits are generally represented by "bags and sags" and "snaking". For the films of the Examples it has been found that both the average bags and sags and the average deviation from the straight line were less than 25 mm.

The film of Example 7 has been used in a HFFS machine MACH 200 manufactured by Otem with the longitudinal heat sealing bar set at a temperature in the range 160–175° C. and the transverse heat sealing bar set at 170°. The machine was set to run at a speed of from a minimum of 30 m/min to a maximum of 41 m/min. Up to the maximum speed tested there has been no trek off. The packaged products were then passed through a shrinking tunnel set at 150° C. for 4 seconds. After the shrinking step the appearance of the packages and the strength of the seals were both highly satisfactory.

The film of Example 11 (width 620 mm) has been tested on an Otem Mach 200 HFFS machine equipped with a Record 4S shrinking tunnel set at 160° C., in the packaging of frozen pizza. The sealing bars were set at a temperature of 160° C. (LD) and 155° C. (TD). Machinability of the film was very good as the products could be run at a speed higher than 30 m/min with no film sticking on the packs at the tunnel exit, good seal strength, and good optical properties, providing a very good package appearance.

EXAMPLE 14

The film of Example 7 has been corona-treated to a surface energy level of 42 dynes/cm. This film has then been used on a MAF machine for roll-wrapping run at 10 m/min. The film edges were simply overlapped and a suitable adhesion was achieved by virtue of the corona treatment. The packages thus formed were passed through a shrink tunnel heated at about 200° C. and then evaluated by both visual inspection and manual torsion with satisfactory results.

EXAMPLE 15

A 15μ thick 3-layer film, A/B/A, with a layer ratio of 1/4/1, wherein A is a blend of EPB2 (94% by weight) and PP2 (6% by weight) comprising slip and antiblocking agents and B is a blend of EPC (45% by weight), PP1 (45% by weight), and regrind scrap material recycled from the film of Example 11 (10% by weight) is prepared by following the same procedure as in Example 11.

EXAMPLE 16

A 20μ thick five layer film A/C/B/C/A with a layer ratio 1/2/3/2/1 wherein A and B are as defined in Example 11 and C is regrind from scrap material of the film of Example 11 is prepared by following the same procedure as in Example 11.

EXAMPLE 17

A 20μ thick five layer film A/C/B/C/A with a layer ratio 1/2/3/2/1 wherein A and B are as defined in Example 11 and C is regrind scrap material from the film of Example 16 is prepared by following the same procedure as in Example 11.

EXAMPLE 18

A 12μ thick 3-layer film, A/B/A, with a layer ratio of 1/3/1, wherein A is EPB2 comprising slip and antiblocking agents and B is a blend of EPC (50% by weight) and PP1 (50% by weight), is prepared by coextrusion through a flat die at a die temperature of from about 200 to about 240° C., followed by sequential orientation on a tenter frame (stretching ratios: 5×8.3, MD×TD) as indicated in Example 1.

We claim:

1. A heat shrinkable multilayer film comprising:
    a) a core layer consisting essentially of a blend of propylene homopolymer with a material selected from the group consisting of:
        i) ethylene/propylene copolymer, and
        ii) ethylene/propylene/butene-1 terpolymer; and
    b) two outer layers each comprising
        i) a major portion, by weight of each respective outer layer, of a polymeric material selected from the group consisting of ethylene/propylene/butene-1 terpolymer, and ethylene/propylene copolymer, and
        ii) propylene homopolymer.

2. The film of claim 1 wherein the core layer consists essentially of between 20 and 70%, by weight of the core layer, of propylene homopolymer.

3. The film of claim 1 wherein the core layer consists essentially of between 25 and 60%, by weight of the core layer, of propylene homopolymer.

4. The film of claim 1 wherein the core layer consists essentially of between 30 and 50%, by weight of the core layer, of propylene homopolymer.

5. The film of claim 1 wherein the outer layers each comprise:
    i) at least 70%, by weight of each respective outer layer, of a polymeric material selected from the group consisting of ethylene/propylene/butene-1 terpolymer, and ethylene/propylene copolymer, and
    ii) propylene homopolymer.

6. The film of claim 1 wherein the outer layers each comprise:
    i) at least 85%, by weight of each respective outer layer, of a polymeric material selected from the group consisting of ethylene/propylene/butene-1 terpolymer, and ethylene/propylene copolymer, and
    ii) propylene homopolymer.

7. The film of claim 1 wherein the outer layers each comprise:
    i) at least 90%, by weight of each respective outer layer, of a polymeric material selected from the group consisting of ethylene/propylene/butene-1 terpolymer, and ethylene/propylene copolymer, and
    ii) propylene homopolymer.

\* \* \* \* \*